US006179285B1

(12) United States Patent
Teumer et al.

(10) Patent No.: US 6,179,285 B1
(45) Date of Patent: Jan. 30, 2001

(54) MEDIA TRANSPORT ASSEMBLY INCORPORATING VACUUM GROOVES TO FLATTEN SHEET

(75) Inventors: Roger G. Teumer; William R. Burger, both of Fairport; Paul S. DeHond, Webster; Eric A. Merz, Webster; W. Keith Gilliland, Webster, all of NY (US)

(73) Assignee: Xerox Corporation, Stamford, CT (US)

( * ) Notice: Under 35 U.S.C. 154(b), the term of this patent shall be extended for 0 days.

(21) Appl. No.: 09/233,111

(22) Filed: Jan. 19, 1999

(51) Int. Cl.[7] ............................ B65H 29/24; G01D 15/24

(52) U.S. Cl. .......................... 271/194; 271/266; 346/134; 346/104

(58) Field of Search .................................... 271/276, 266, 271/194; 346/134, 104, 139 R

(56) References Cited

U.S. PATENT DOCUMENTS

| | | | | |
|---|---|---|---|---|
| 3,288,037 | * | 11/1966 | Burnett | 346/134 |
| 4,302,103 | * | 11/1981 | Zeunen | 355/84 |
| 4,326,656 | * | 4/1982 | Gregory et al. | 226/59 |
| 4,463,361 | * | 7/1984 | Koumura et al. | 346/134 |
| 5,004,221 | * | 4/1991 | Stark | 271/194 |
| 5,197,812 | * | 3/1993 | Worley et al. | 400/635 |
| 5,456,543 | | 10/1995 | Witte et al. . | |
| 5,479,199 | * | 12/1995 | Moore et al. | 347/102 |
| 5,581,289 | * | 12/1996 | Firl et al. | 347/104 |
| 5,902,058 | * | 5/1999 | Koiket et al. | 400/578 |

* cited by examiner

*Primary Examiner*—Donald P. Walsh
*Assistant Examiner*—Daniel K Schlak
(74) *Attorney, Agent, or Firm*—Oliff & Berridge, PLC

(57) ABSTRACT

A media transport system for transporting a media sheet in a marking device includes an entrance drive assembly, an exit drive assembly and a vacuum generator that applies a vacuum force to the media sheet to form a wide, flat printing zone. The entrance drive assembly receives and transports the media sheet in a process direction by contacting top and bottom surfaces of the media sheet, thereby exerting an entrance drive force on the media sheet. The exit drive assembly receives and transports the media sheet by contacting the top and bottom surfaces of the media sheet, thereby exerting an exit drive force on the media sheet. The vacuum force is applied to the media sheet in an area of the media sheet between the entrance drive assembly and the exit drive assembly. The vacuum force on the media sheet acts in a vacuum force direction substantially normal to the process direction. The vacuum force is set such that the entrance drive force and the exit drive force in the process direction each exceed the vacuum force acting in the vacuum force direction.

18 Claims, 2 Drawing Sheets

MEDIA TRANSPORT ASSEMBLY INCORPORATING VACUUM GROOVES TO FLATTEN SHEET

BACKGROUND OF THE INVENTION

1. Field of Invention

This invention relates to marking devices and, in particular, to a media transport assembly and method in which a media sheet is pushed and/or pulled by step advancing drive assemblies in a highly repeatable manner against the action of a vacuum force applied to hold the media sheet flat for accurate scanned marking.

2. Description of Related Art

Consumers continue to demand marking devices with increased capabilities. For example, consumers now desire a low cost alternative to conventional laser color printers. Marking devices using other technologies (e.g., ink jet printing) potentially provide such a low-cost alternative, but must be configured to operate at speeds comparable to the competing laser printers.

In marking devices with one or more moving print elements that reciprocate across the width of a media sheet (i.e., from left to right or from right to left) in passes, the media sheet is marked in swaths equal to the length of the print element(s). The operating speed of such a marking device can be increased by increasing the size to the swath marked in each pass. With a larger swath size, fewer passes are required to mark each media sheet.

As the print swath area increases, the area of the marking zone must be increased. The marking zone is defined as the area of the media sheet available for marking in the current swath. The marking zone extends between the entrance drive assembly immediately upstream of the print element(s) to the exit drive assembly immediately downstream of the print element(s). With an increased marking zone area, maintaining the flatness of the media sheet and providing a highly accurate incremental media advance without increasing lead and/or trail edge borders to ensure accurate marking, becomes more difficult. Because the gap between the print element(s) and the media sheet is small (on the order of 1.1 mm), it is not possible to secure the media sheet from the reverse side. In typical marking devices with moving print elements, sufficient flatness and advance accuracy of the media sheet is a concern in leading edge or trailing edge marking situations.

In leading edge or trailing edge marking situations, only one edge of the media sheet is secured and driven by the entrance drive assembly or the exit drive assembly. In contrast, when middle portions of the media sheet are being marked, the leading portion is secured by the exit drive assembly and the trailing portion is secured by the entrance drive assembly. Thus, the flatness of the media sheet and the advance accuracy must be ensured by appropriate tensioning between the entrance drive assembly and the exit drive assembly.

Accordingly, it would be desirable to provide a media transport system capable of advancing at a sufficient speed and accuracy, while ensuring that the media sheet is sufficiently flat.

SUMMARY OF THE INVENTION

According to the invention, a media transport system and method are provided by which a media sheet is transported through the marking device by an entrance drive assembly and/or an exit drive assembly, and a portion of the media sheet between the entrance drive assembly and the exit drive assembly is subjected to a vacuum force.

According to a preferred embodiment, the media transport system includes an entrance drive assembly and an exit drive assembly. The entrance drive assembly receives and transports the media sheet in a process direction by contacting top and bottom surfaces of the media sheet. The entrance drive assembly exerts an entrance drive force on the media sheet. The exit drive assembly receives and transports the media sheet by contacting the top and bottom surfaces of the media sheet. The exit drive assembly is spaced from the entrance drive assembly and exerts an exit drive force on the media sheet.

A vacuum generator applies a vacuum force to the media sheet in the area of the media sheet between the entrance drive assembly and the exit drive assembly. The vacuum force acts on the media sheet in a vacuum force direction substantially normal to the process direction. The vacuum force is set such that the entrance drive force and the exit drive force acting in the process direction are each greater than the vacuum force acting in the vacuum force direction. Preferably, the vacuum force is also set to maintain the media sheet within a desired flatness range.

Preferably, the entrance drive assembly and the exit drive assembly each include a pair of drive elements that contact each other to form, respectively, an entrance nip and an exit nip. Preferably, each pair of drive elements includes a driven element and an idler element with sufficient pressure between them to prevent slip during the media advance. Preferably, each pair of drive elements includes a dual grit coated roll. Further, each pair of drive elements preferably includes an elastomer roll.

The media transport system preferably includes a platen positioned in the area between the entrance drive assembly and the exit drive assembly. The platen has a media sheet side, a vacuum force side opposite the media sheet side and vacuum holes extending through the media sheet side to the vacuum force side. The vacuum force is generated on the vacuum force side of the platen and applied to the media sheet through the vacuum holes to draw the media sheet against the media sheet side.

The media sheet side of the platen preferably includes vacuum grooves that communicate with the vacuum holes. Preferably, the vacuum grooves extend in the process direction. Preferably, the vacuum force applied to the media sheet is substantially constant. Preferably, the length of the grooves is set to allow acquisition or release of the media in a controlled manner to prevent a sudden retard action in the drive system that would cause image distortion.

The vacuum grooves are preferably arranged in rows extending perpendicular to the process direction. The vacuum grooves within each row are preferably spaced apart from each other, and the vacuum grooves in a first row are staggered with respect to the vacuum grooves in a second row.

Preferably, the vacuum generator includes an entrance fan having an entrance plenum positioned near a media sheet entrance area of the platen and an exit fan having an exit plenum positioned near a media sheet exit area of the platen.

The media transport system preferably includes edge guides extending along the platen in the process direction. The edge guides receive, guide and hold the edges of the media sheet flat.

The media transport system preferably includes a drive motor coupled to the entrance drive assembly and to the exit drive assembly by respective helical gears with associated anti-backlash springs. The media transport system preferably includes a spring plate positioned across the entrance area of the platen that guides the media sheet into contact with the vacuum force.

BRIEF DESCRIPTION OF THE DRAWINGS

Preferred embodiments of the invention will be described with reference to the following drawings wherein like reference numerals refer to like elements and wherein.

DETAILED DESCRIPTION OF PREFERRED EMBODIMENTS

Figure 1:
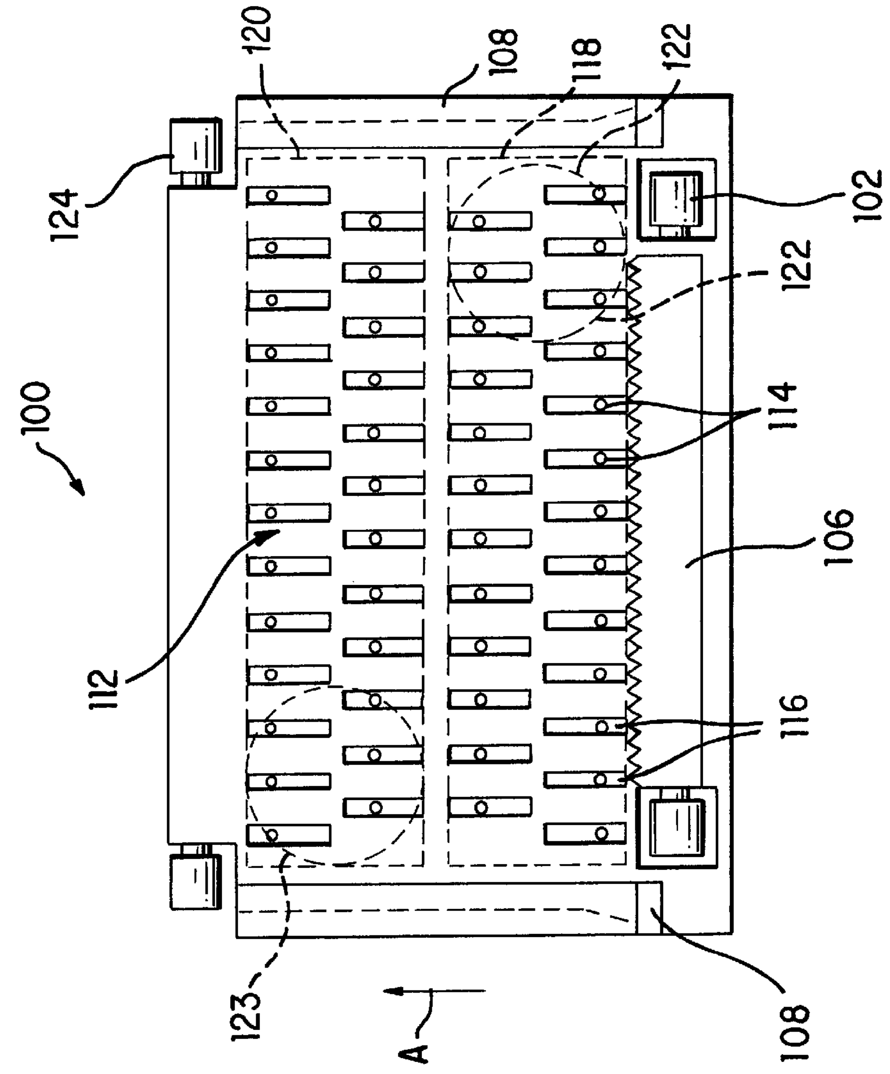
FIG. 1 is a plan view of a media transport assembly according to the invention.
Figure 2:
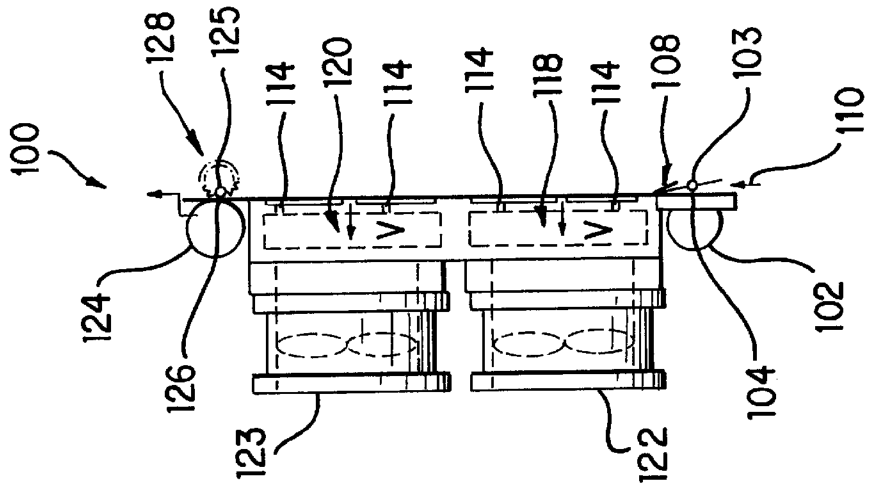
FIG. 2 is a side view of the media transport assembly shown in FIG. 1.

FIGS. 1 and 2 are plan and side views, respectively, of a preferred embodiment of the media transport assembly 100. According to the invention, the media transport assembly transports a media sheet 110 (e.g., a sheet of paper or transparency material) (see FIG. 2) in a process direction A from a pair of entrance nips 104 across a platen 112 to and through a pair of exit nips 126. The pairs of entrance nips 104 and exit nips 126 are positioned at left and right sides of the media transport assembly 100.

The media sheet 110 is transported by the action of an entrance drive roll 102 at each of the entrance nips 104 and an exit drive roll 124 at each of the exit nips 126 located on each of left and right borders of the media sheet 110. The entrance nip 104 on each side is defined by a point of contact between the entrance drive roll 124 and an entrance idler roll 103. Similarly, the exit nip 126 on each side is defined by a point of contact between the exit drive roll 124 and an exit idler roll 125.

The entrance drive roll 102 and the exit drive roll 124 are driven by a known drive assembly, which is described below in connection with FIG. 3, to advance the media sheet 110 stepwise in the process direction A. Preferably, each entrance drive roll 102 and exit drive roll 124 are each dual grit coated, and each entrance idler roll 103 and exit idler roll 125 are made of an elastomer material. In a preferred embodiment, the diameter and runout tolerances for the entrance drive roll 102 and the exit drive roll 124 are maintained within 0.0002 in. The forces developed on the media sheet 110 in the entrance nip 104 and in the exit nip 126 are preferably at least 2.75 lb. In a preferred embodiment, each entrance drive roll 102 and its respective entrance idler roll 103 and each exit drive roll 124 and it respective exit idler roll 125 drive the media sheet without slippage.

As the media sheet 110 is transported across the platen 112, desired areas of the media sheet 110 are marked, e.g., by a conventional marking technology, including ink jet printing, piezoelectric printing, etc. In the case of ink jet printing and other similar marking technologies, the marked areas on the media sheet 110 may remain moist for a period after marking, depending upon the type of ink, density of marking and speed of the marking process. Therefore, each exit nip 126 is positioned to receive a left or right edge (i.e., in a margin typically outside the marking area), respectively, of the marked media sheet 110 to minimize possible smearing of the marked areas and other detrimental effects.

According to the present invention, the media sheet 110 is driven against a vacuum force V (see FIG. 2) applied in a direction normal to the media sheet 110. The vacuum force V acts to flatten the media sheet 110. In a preferred embodiment, the vacuum force V draws the media sheet against a platen 112, which is substantially flat, thus ensuring that a portion of the media sheet 110 to be marked is flat.

The drive force generated at the entrance nips 104 and/or the exit nips 126 must be sufficiently great to operate without slip on the media, under all operating conditions, including the resistance to movement in the direction A resulting from the vacuum force V. These operating conditions for transport of the media sheet 110 include: (1) initial transport by the entrance nips 104 alone (i.e., the "leading edge situation" in which the exit nips 126 are not yet engaged with the media sheet 110, and the entrance nips 104 are "pushing" the media sheet 110 forward against the vacuum force V); (2) intermediate transport in which the media sheet is engaged in the entrance nips 104 and the exit nips 126; and (3) final transport by the exit nips 126 alone (i.e., the "trailing edge situation" in which the entrance nips 104 have released the trailing edge of the media sheet 110, and the exit nips 126 are "pulling" the media sheet 110 forward against the vacuum force V).

Although an entrance drive force generated by the entrance nips 104 and an exit drive force generated by the exit nips 126 are substantially constant in one embodiment, the invention applies equally to situations where one or more of the entrance drive force, the exit drive force and the vacuum force V are variable.

The vacuum force V is applied to the media sheet 110 through the platen 112. Specifically, the platen 112 includes a predetermined pattern of vacuum holes 114 and vacuum grooves 116. Each of the vacuum holes 114 extends from a top surface of one of the vacuum grooves 116 (i.e., from the "media sheet" side of the platen 112) and through to a reverse side of the platen 112 (i.e., the "vacuum force" side). An entrance fan 122 and an exit fan 123 are respectively positioned over an entrance plenum 118 and an exit plenum 120.

The entrance fan 122 is shown positioned over the right side of the platen 112, and the exit fan 123 is shown positioned over the left side of the platen 112. As shown in FIG. 1, the entrance plenum 118 is generally rectangular in shape and covers approximately half of the marking zone between the entrance nips 104 and a midline of the platen 112. Similarly, the exit plenum 120 is also rectangular in shape and covers approximately the other half of the marking zone from the midline of the platen 112 to the exit nips 126. The entrance plenum 118 and the exit plenum 120 are preferably formed of plastic.

The entrance plenum 118 and exit plenum 120 channel the vacuum force V generated by the entrance fan 122 and the exit fan 123, respectively, through the vacuum holes 114 and along the vacuum grooves 116 to the media sheet 110. The vacuum grooves 116 permit the vacuum force V applied through the vacuum holes 114 to be spread over a greater area.

The vacuum grooves 116 in each of the entrance plenum 118 and exit plenum 120 areas are arranged in a spaced relationship in two rows (from left to right). The vacuum grooves 116 preferably extend parallel to the direction A.

The configuration of the vacuum grooves 116 is such that vacuum force is provided to the media sheet 110 along substantially the entire length of the marking zone. Also, the configuration of the vacuum grooves provides for smooth transition from full vacuum force (i.e., when the grooves are entirely covered) to no vacuum force (i.e., when the trailing edge of the media sheet 110 passes the ends of the vacuum grooves 116). Although a series of vacuum holes could be used in place of the vacuum grooves 116, the vacuum grooves 116 provide for more continuous changes in the vacuum force V.

The vacuum grooves 116 in the second row preferably are staggered with respect to the vacuum grooves in the first row. Thus, for both the entrance plenum 18 and exit plenum 120 areas, the vacuum grooves 116 in one row are opposite the spaces between the vacuum grooves 116 in the other row. The vacuum grooves 116 in the second row of the entrance plenum area 18, however, are preferably positioned opposite the vacuum grooves 116 in the first row of the exit plenum area 120.

Although a preferred configuration has been described, the number and location of the fans, the corresponding number and size of the plenums, and the precise geometry and pattern of the vacuum grooves and vacuum holes can be modified to suit any particular application without departing from the invention.

In a preferred embodiment, the entrance fan 122 and the exit fan 123 are muffin fans. In the embodiment described above, each fan must generate a suction force equivalent to a few millimeters of negative water pressure. In one embodiment, ebm/Pabst DC Variofan Models 612GMI or 612GI are used.

Edge guides 108 are attached to the left and right sides of the platen 112 to guide and ensure flatness of the left and right edges of the media sheet 110 as it is transported. The edge guides 108 in a preferred embodiment overlap the edges of the media sheet 110 by approximately 3 mm. A lightly loaded spring plate 106 extending across an entrance side of the platen 112 ensures that the media sheet 110 will be guided into the vacuum force existing in the entrance platen 118 area A row of starwheels 128 aligned with each exit nip 126 and spaced slightly above the level of the platen 112 prevents image smearing as the media sheet 110 exits the platen 112.

Figure 3:
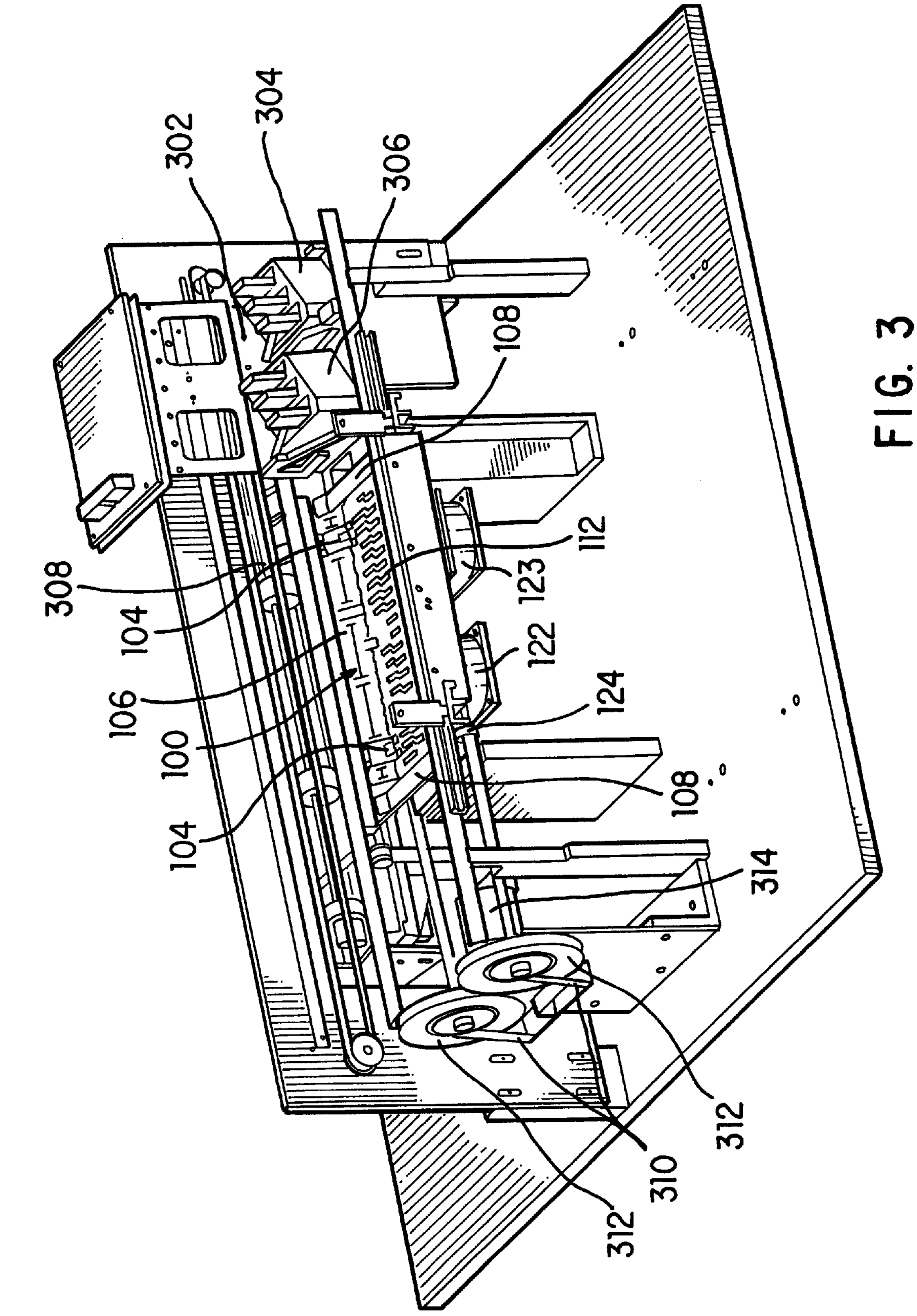
FIG. 3 is a perspective view of the media transport assembly of FIGS. 1 and 2 with the surrounding carriage, ink jet cartridge and support structure of an ink marking device.

FIG. 3 shows the media transport assembly 100 configured with a scanning carriage 302 for a partial width array printhead for a color ink marking device. The scanning carriage 302 reciprocates from left to right over the marking zone to allow desired portions of the media sheet 110 (not shown) to be marked by the black cartridge 304 and/or the color cartridge 306. The black cartridge 304 and the color cartridge 306 in the illustrated embodiment each contain three printheads, each having a swath width of approximately 0.5 inches, in a staggered configuration (i.e., capable of marking a 1.5 inch swath in each pass of the carriage).

The marking zone in the illustrated embodiment is approximately 8½ inches from the left side to the right side by 3 inches from an entrance side to an exit side of the platen 112. A 3 inch marking zone is required because the black cartridge 304 and/or the color cartridge 306 mark the media sheet in each of two passes. A distance of approximately 4 inches separates the entrance nips 104 from the exit nips 126. The nominal printhead to media gap (not shown) is 1.1 mm. Experimentation has shown that a media flatness requirement of 0.3 mm ensures marking of sufficient quality.

Each entrance drive roll 102 and each exit drive roll 124 are driven by respective helical drive gears 312. The helical drive gears 312 are driven by a drive motor and a pinion 314. The helical drive gears 312 are spring loaded by anti-backlash springs 310 to prevent any drive errors due to tooth separation. In preferred embodiments, a stepper motor or a DC servo motor is used as the drive motor. The ratios between the helical gears 312 and the drive motor and pinion 310 are preferably selected such that one revolution of the pinion advances the media sheet 110 forward by one-half a swath width (i.e., approximately 0.25 inch in the illustrated embodiment). The advance increment may be varied depending on the type and quality of image to be printed, e.g., draft mode, text, graphics or photographs. The advance increment is set to equal one revolution of the pinion (i.e., the smallest advance of the media) in, e.g., a high quality photograph printing mode (which produces the slowest output) or, in this device, one-half the print element width. Greater advance increments are then multiples of the single revolution increment up to six for maximum speed printing.

Although this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. A media transport system that transports a media sheet in a marking device, comprising:

an entrance drive assembly that receives and transports the media sheet in a process direction by contacting top and bottom surfaces of the media sheet, the entrance drive assembly exerting an entrance drive force on the media sheet;

an exit drive assembly that receives and transports the media sheet by contacting the top and bottom surfaces of the media sheet, the exit drive assembly being spaced from the entrance drive assembly and exerting an exit drive force on the media sheet;

a platen positioned in an area between the entrance drive assembly and the exit drive assembly, the platen having a media sheet side, a vacuum force side opposite the media sheet side, vacuum holes extending through the media sheet side to the vacuum force side, and vacuum grooves included in the media sheet side of the platen and formed partially through the platen, the vacuum grooves being respectively in communication with the vacuum holes; and a vacuum generator that applies a vacuum force to the media sheet through the vacuum holes, the vacuum generator positioned on the vacuum force side, the vacuum force acting on the media sheet in a vacuum force direction substantially normal to the process direction to urge the media sheet towards the media sheet side of the platen, wherein the vacuum force is set such that the entrance drive force and the exit drive force acting in the process direction are each greater than the vacuum force acting in the vacuum force direction.

2. The media transport system of claim 1, wherein the vacuum force is also set to maintain the media sheet within a desired flatness range.

3. The media transport system of claim 1, wherein the entrance drive assembly and the exit drive assembly each include a pair of non-slip drive elements that contact each other to form, respectively, an entrance nip and an exit nip.

4. The media transport system of claim 3, wherein each pair of drive elements includes a driven element and an idler element.

5. The media transport system of claim 3, wherein each pair of drive elements includes a dual grit coated roll.

6. The media transport system of claim 3, wherein each pair of drive elements includes an elastomer roll.

7. The media transport system of claim 1, further comprising a drive motor coupled to the entrance drive assembly and to the exit drive assembly by respective helical gears and anti-backlash springs.

8. The media transport system of claim 7, wherein the drive motor and helical gears are configured to provide a desired minimum media advance amount for each drive motor revolution.

9. The media transport system of claim 1, further comprising edge guides extending along the platen in the process direction, the edge guides receiving, guiding and holding flat the edges of the media sheet.

10. The media transport system of claim 1, further comprising a spring plate attached to the entrance area of the platen that guides the media sheet into contact with the vacuum force.

11. The media transport system of claim 1, wherein the vacuum grooves extend in the process direction.

12. The media transport system of claim 11, wherein the vacuum grooves are arranged in rows extending perpendicular to the process direction, the vacuum grooves within each of the rows being spaced apart from each other, and the vacuum grooves in a first row are staggered with respect to the vacuum grooves in a second row.

13. The media transport system of claim 1, wherein the vacuum force applied to the media sheet by the vacuum generator is substantially constant.

14. The media transport system of claim 1, wherein the vacuum generator includes an entrance fan having an entrance plenum positioned near a media sheet entrance area of the platen and an exit fan having an exit plenum positioned near a media sheet exit area of the platen.

15. A media transport method for transporting a media sheet in a marking device, comprising:

transporting the media sheet in a process direction across a platen that has a media sheet side, a vacuum force side opposite the media sheet side, vacuum holes extending through the media sheet side to the vacuum force side, and vacuum grooves included in the media sheet side of the platen and formed partially through the platen, the vacuum grooves being respectively in communication with the vacuum holes, by contacting top and bottom surfaces of the media sheet with at least one of an entrance drive assembly that applies an entrance drive force and an exit drive assembly that applies an exit drive force, the exit drive assembly being spaced from the entrance drive assembly; and applying a vacuum force on the media sheet through the vacuum holes, the vacuum force acting in a vacuum force direction substantially normal to the process direction to urge the media sheet towards the media sheet side of the platen, wherein the vacuum force is applied such that the entrance drive force and the exit drive force acting in the process direction each exceed the vacuum force acting in the vacuum force direction.

16. The media transport method of claim 15, wherein the vacuum force is set to maintain the media sheet within a desired flatness range.

17. The media transport method of claim 15, wherein transporting the media sheet includes pushing the media sheet in the process direction with only the entrance drive assembly while applying the vacuum force to a leading edge portion of the media sheet before the leading edge portion reaches the exit drive assembly.

18. The media transport method of claim 15, wherein transporting the media sheet includes pulling the media sheet in the process direction with only the exit drive assembly while applying the vacuum force to a trailing edge portion of the media sheet after the trailing edge portion has exited the entrance drive assembly.

* * * * *